(12) United States Patent
Roy et al.

(10) Patent No.: US 10,758,080 B2
(45) Date of Patent: Sep. 1, 2020

(54) REFRIGERATOR APPLIANCE AND EXTRACTION FLUID ASSEMBLY

(71) Applicant: Haier US Appliance Solutions, Inc., Wilmington, DE (US)

(72) Inventors: Anirban Roy, Hyderabad (IN); Srinivas Pasham, Hyderabad (IN); Sharath Chandra, Hyderabad (IN); Sasikumar Madanagopal, Hyderabad (IN); Gregory Sergeevich Chernov, Louisville, KY (US); Andrew Reinhard Krause, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 526 days.

(21) Appl. No.: 15/610,680

(22) Filed: Jun. 1, 2017

(65) Prior Publication Data
US 2018/0344076 A1    Dec. 6, 2018

(51) Int. Cl.
*A47J 31/46* (2006.01)
*F25D 23/12* (2006.01)
(Continued)

(52) U.S. Cl.
CPC ............ *A47J 31/46* (2013.01); *A23L 27/36* (2016.08); *A47J 31/446* (2013.01); *B67D 1/00* (2013.01);
(Continued)

(58) Field of Classification Search
CPC ......... A47J 31/46; A47J 31/446; A23L 27/36; A23V 2002/00; B67D 1/00; F25D 23/126; F25D 2323/121; F25D 2323/122

USPC .......... 210/175, 184, 257.1, 435; 222/146.6, 222/189.01, 189.1, 189.11, 162, 325, 160, 222/326; 62/317, 318, 389, 392; 99/290
See application file for complete search history.

(56) References Cited

U.S. PATENT DOCUMENTS

| 6,333 A * | 4/1849 | Andrews et al. ... B01F 3/04808 426/477 |
| 2,229,850 A * | 1/1941 | Hoskins ................ F25D 23/126 62/299 |

(Continued)

FOREIGN PATENT DOCUMENTS

| CN | 102816192 A | 12/2012 |
| CN | 104876981 | 9/2015 |

(Continued)

*Primary Examiner* — Jimmy Chou
(74) *Attorney, Agent, or Firm* — Dority & Manning, P.A.

(57) ABSTRACT

A refrigerator appliance and extraction is provided herein. The extraction fluid assembly may include a fluid tank, an open container, a filter assembly, a dispenser housing, and a precision doser. The fluid tank may define an extraction chamber to receive a liquid solvent. The open container may be selectively disposed on the fluid tank to hold an additive within the extraction chamber. The filter assembly may be positioned beneath the fluid tank along a vertical direction in fluid communication with the extraction chamber. The dispenser housing may support the filter assembly. The dispenser housing may also define a dispensing chamber positioned beneath the filter assembly in fluid communication therewith. The precision doser may be in fluid communication with the dispensing chamber to direct an extraction fluid therefrom.

20 Claims, 9 Drawing Sheets

(51) Int. Cl.
*A47J 31/44* (2006.01)
*A23L 27/30* (2016.01)
*B67D 1/00* (2006.01)

(52) U.S. Cl.
CPC ........ *F25D 23/126* (2013.01); *A23V 2002/00* (2013.01); *F25D 2323/121* (2013.01); *F25D 2323/122* (2013.01)

(56) References Cited

U.S. PATENT DOCUMENTS

| | | | | |
|---|---|---|---|---|
| 2,982,114 | A * | 5/1961 | Cobb | F25D 23/126 62/338 |
| 3,914,957 | A * | 10/1975 | Jacobs | F25B 25/005 62/338 |
| 4,721,035 | A | 1/1988 | Chang-Diaz | |
| 4,958,747 | A * | 9/1990 | Sheets | B67D 1/0009 222/129 |
| 5,490,547 | A * | 2/1996 | Abadi | B67D 3/0009 141/21 |
| 5,637,214 | A * | 6/1997 | Kahana | A47J 31/605 210/282 |
| 5,672,253 | A * | 9/1997 | Hwang | C02F 1/005 204/240 |
| 5,813,246 | A * | 9/1998 | Oh | B67D 1/0835 137/614.04 |
| 5,972,120 | A | 10/1999 | Kutowy et al. | |
| 6,103,114 | A * | 8/2000 | Tanner | C02F 1/003 210/232 |
| 6,339,985 | B1 * | 1/2002 | Whitney | A47J 31/061 99/286 |
| 6,524,477 | B1 * | 2/2003 | Hughes | C02F 1/003 210/282 |
| 6,555,074 | B1 | 4/2003 | Sweet | |
| 6,574,984 | B1 * | 6/2003 | McCrea | B67D 3/0009 222/146.6 |
| 6,684,648 | B2 * | 2/2004 | Faqih | B01D 5/009 62/93 |
| 7,658,212 | B2 * | 2/2010 | Meuleners | F25D 23/126 141/360 |
| 8,011,537 | B2 * | 9/2011 | Muthumani | B67D 1/001 141/117 |
| 8,091,735 | B2 * | 1/2012 | Girard | B05B 7/2481 222/54 |
| 8,097,159 | B1 * | 1/2012 | Peng | C02F 1/003 210/244 |
| 8,323,490 | B1 * | 12/2012 | Wright | C02F 1/002 210/232 |
| 8,377,292 | B2 * | 2/2013 | Patera | C02F 1/003 141/198 |
| 8,556,127 | B2 * | 10/2013 | Olson | B67D 7/02 222/162 |
| 8,893,927 | B2 * | 11/2014 | Olson | B01F 5/0496 222/162 |
| 8,905,383 | B2 * | 12/2014 | Ko | F25D 23/126 261/26 |
| 9,085,453 | B2 * | 7/2015 | McMahan | F25D 23/126 |
| 9,149,745 | B2 * | 10/2015 | Senninger | B01D 35/02 |
| 10,053,377 | B2 * | 8/2018 | Ono | C02F 1/003 |
| 2002/0029694 | A1 * | 3/2002 | Wong | A47J 31/053 99/280 |
| 2002/0046569 | A1 * | 4/2002 | Faqih | E03B 3/28 62/188 |
| 2002/0092869 | A1 * | 7/2002 | Tiemann | G01F 11/086 222/249 |
| 2003/0097314 | A1 * | 5/2003 | Crisp, III | B67D 1/0021 705/28 |
| 2003/0198465 | A1 * | 10/2003 | Cai | A47J 31/542 392/471 |
| 2004/0261443 | A1 * | 12/2004 | Crisp, III | B67D 1/0858 62/390 |
| 2005/0160755 | A1 * | 7/2005 | Jeong | F25D 25/025 62/318 |
| 2005/0178273 | A1 * | 8/2005 | Meuleners | B67D 1/0858 99/279 |
| 2006/0000763 | A1 * | 1/2006 | Rinker | C02F 1/003 210/282 |
| 2006/0107839 | A1 * | 5/2006 | Nenov | A47J 31/368 99/275 |
| 2006/0162572 | A1 * | 7/2006 | Chiu Liu | A47G 19/16 99/317 |
| 2006/0191824 | A1 * | 8/2006 | Arett | A47G 19/12 210/85 |
| 2006/0260345 | A1 * | 11/2006 | Coulter | F25D 23/063 62/340 |
| 2007/0157641 | A1 * | 7/2007 | Ferragut, II | B67D 1/0009 62/139 |
| 2008/0134711 | A1 * | 6/2008 | Kim | F25D 11/022 62/344 |
| 2008/0141697 | A1 * | 6/2008 | Coleman | F25D 23/126 62/318 |
| 2008/0156015 | A1 * | 7/2008 | Meyerholtz | F25D 23/126 62/318 |
| 2009/0039032 | A1 * | 2/2009 | Patera | C02F 1/4672 210/760 |
| 2009/0126392 | A1 * | 5/2009 | An | F25D 23/126 62/389 |
| 2009/0246341 | A1 * | 10/2009 | Pitner | A23F 3/16 426/435 |
| 2010/0000416 | A1 * | 1/2010 | Mulhauser | A47J 31/0573 99/306 |
| 2010/0170284 | A1 * | 7/2010 | An | F25D 23/126 62/340 |
| 2010/0229592 | A1 * | 9/2010 | Lim | F25D 11/00 62/389 |
| 2010/0275633 | A1 * | 11/2010 | An | B01D 35/147 62/318 |
| 2011/0067433 | A1 * | 3/2011 | An | F25D 23/126 62/465 |
| 2011/0126577 | A1 * | 6/2011 | An | F25D 23/126 62/389 |
| 2011/0256273 | A1 * | 10/2011 | de Graaff | G01F 11/46 426/112 |
| 2011/0278206 | A1 * | 11/2011 | Hull | C02F 1/003 210/85 |
| 2011/0283734 | A1 * | 11/2011 | Koo | F25D 23/126 62/389 |
| 2012/0006046 | A1 * | 1/2012 | An | F25C 1/00 62/318 |
| 2012/0024003 | A1 * | 2/2012 | Kim | F25D 25/025 62/389 |
| 2012/0074224 | A1 * | 3/2012 | Dunsbergen | G06K 19/06046 235/454 |
| 2012/0102998 | A1 * | 5/2012 | Chase | F25D 23/12 62/389 |
| 2012/0104026 | A1 * | 5/2012 | Hortin | F25D 31/002 99/275 |
| 2012/0111031 | A1 * | 5/2012 | Lee | F25D 23/126 62/66 |
| 2012/0111048 | A1 * | 5/2012 | Kim | F25D 23/126 62/344 |
| 2012/0292238 | A1 * | 11/2012 | Wright | C02F 1/444 210/137 |
| 2012/0304679 | A1 * | 12/2012 | Krause | F25D 23/126 62/275 |
| 2013/0062366 | A1 * | 3/2013 | Tansey | B67D 1/0021 222/102 |
| 2013/0098250 | A1 * | 4/2013 | Satoh | A61P 39/06 99/323.1 |
| 2013/0118203 | A1 * | 5/2013 | Seo | B67D 3/0009 62/389 |
| 2013/0186280 | A1 * | 7/2013 | Sekiguchi | A47J 31/005 99/287 |
| 2014/0007609 | A1 * | 1/2014 | Lee | F25D 23/126 62/389 |
| 2014/0131265 | A1 * | 5/2014 | Patera | B01D 24/007 210/201 |
| 2014/0165622 | A1 * | 6/2014 | Boarman | F25C 1/10 62/72 |

(56) References Cited

U.S. PATENT DOCUMENTS

| | | | | |
|---|---|---|---|---|
| 2014/0165643 A1* | 6/2014 | Boarman | ............... | F25C 1/24 62/340 |
| 2014/0263020 A1* | 9/2014 | MacDonald | ............ | C02F 1/003 210/232 |
| 2014/0318377 A1* | 10/2014 | Chen | ............... | A47J 31/10 99/281 |
| 2015/0157967 A1* | 6/2015 | Krause | ............... | B01D 35/153 62/318 |
| 2015/0192353 A1* | 7/2015 | Lee | ............... | F25D 23/126 312/325 |
| 2015/0211784 A1* | 7/2015 | Krause | ............... | F25D 23/126 62/275 |
| 2015/0216355 A1* | 8/2015 | Duvall | ............... | A47J 31/52 99/282 |
| 2015/0224432 A1* | 8/2015 | An | ............... | F25D 23/126 62/344 |
| 2015/0225225 A1* | 8/2015 | Tae | ............... | B67D 1/0858 222/146.2 |
| 2015/0300729 A1* | 10/2015 | Seo | ............... | F25D 23/126 62/126 |
| 2015/0376029 A1* | 12/2015 | Gooden | ............... | B01D 35/30 210/681 |
| 2016/0059192 A1* | 3/2016 | Jeong | ............... | B01F 3/04808 99/323.2 |
| 2016/0083241 A1* | 3/2016 | Koo | ............... | F25D 23/126 222/1 |
| 2016/0178273 A1* | 6/2016 | Hall | ............... | F25D 23/04 62/338 |
| 2016/0238305 A1* | 8/2016 | An | ............... | A23L 2/00 |
| 2016/0251233 A1* | 9/2016 | Levanon | ............... | A01K 63/04 210/617 |
| 2017/0280924 A1* | 10/2017 | Sakane | ............... | A47J 31/44 |
| 2018/0149416 A1* | 5/2018 | Lee | ............... | B01D 29/96 |
| 2019/0330043 A1* | 10/2019 | Carpenter | ............... | B67D 1/08 |

FOREIGN PATENT DOCUMENTS

| | | |
|---|---|---|
| RU | 2239333 C1 | 11/2004 |
| WO | WO2014118415 A1 | 8/2014 |

* cited by examiner

REFRIGERATOR APPLIANCE AND EXTRACTION FLUID ASSEMBLY

FIELD OF THE INVENTION

The present subject matter relates generally to refrigerator appliances and assemblies for producing extraction fluids, such as stevia.

BACKGROUND OF THE INVENTION

In the past, various methods and systems have been used to create liquid extractions, such as herbal teas and tinctures, as well as other liquids for human consumption. Such systems often subject specific leaves or biomaterial to a liquid solvent. In particular, the plant *Stevia rebaudiana* (known commonly as the "stevia plant") has been used for centuries for its desirable properties. Under certain conditions, steviol glycosides (e.g., stevioside and rebaudioside) may be extracted from leaves produced by the stevia plant. These steviol glycosides generally produce a desirable sweetness in a stevia extract, similar to sugar. However, unlike sugar, these steviol glycosides do not have any calories when ingested. The stevia extract may also possess antioxidants and essential vitamins useful in promoting human health. Moreover, unlike many commercially-produced "stevia" products, pure stevia extracts contain no refined sugars or artificial additives that might color the taste of the stevia extract or reduce its healthful benefits. Once produced, a stevia extract may be kept for several days or weeks if stored at a chilled temperature (e.g., at or below 4° Celsius).

Although the stevia extract possesses a number of desirable benefits and uses, existing systems for generating such extracts come with certain drawbacks. For instance, many systems are not suitable for individual or residential use. Their size and complexity make them unfeasible for most consumers. Furthermore, as an herbal extract, plant matter and various other potentially suspended materials may need to be removed from any resulting liquid extract. This removal can be difficult, and cleaning an overall apparatus may be especially inconvenient.

Accordingly, a system or apparatus that addresses one or more of these issues would be advantageous.

BRIEF DESCRIPTION OF THE INVENTION

Aspects and advantages of the invention will be set forth in part in the following description, or may be obvious from the description, or may be learned through practice of the invention.

In one aspect of the present disclosure, a refrigerator appliance is provided. The refrigerator appliance may include a cabinet defining a chilled chamber, a door, and an extraction fluid assembly. The door may be rotatably hinged to the cabinet to rotate between a closed position restricting access to the chilled chamber and an open position permitting access to the chilled chamber. The extraction fluid assembly may be positioned within the chilled chamber at the closed position. The extraction fluid assembly may include a fluid tank, an open container, a filter assembly, a dispenser housing, and a precision doser. The fluid tank may define an extraction chamber to receive a liquid solvent. The open container may be selectively disposed on the fluid tank to hold an additive within the extraction chamber. The filter assembly may be positioned beneath the fluid tank along a vertical direction in fluid communication with the extraction chamber. The dispenser housing may support the filter assembly. The dispenser housing may also define a dispensing chamber positioned beneath the filter assembly in fluid communication therewith. The precision doser may be in fluid communication with the dispensing chamber to direct an extraction fluid therefrom.

In another aspect of the present disclosure, a stackable extraction fluid assembly is provided. The stackable extraction fluid assembly may include a fluid tank, an open container, a filter assembly, a dispenser housing, and a precision doser. The fluid tank may define an extraction chamber to receive a liquid solvent. The open container may be selectively disposed on the fluid tank to hold an additive within the extraction chamber. The filter assembly may be positioned beneath the fluid tank along a vertical direction in fluid communication with the extraction chamber. The dispenser housing may support the filter assembly and the fluid tank. The dispenser housing may also define a dispensing chamber positioned beneath the filter along the vertical direction in fluid communication therewith. The filter assembly may be selectively stacked between the fluid tank and the dispenser housing. The precision doser may be positioned beneath the filter assembly in fluid communication with the dispensing chamber to direct an extraction fluid therefrom.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

DETAILED DESCRIPTION

Figure 1:
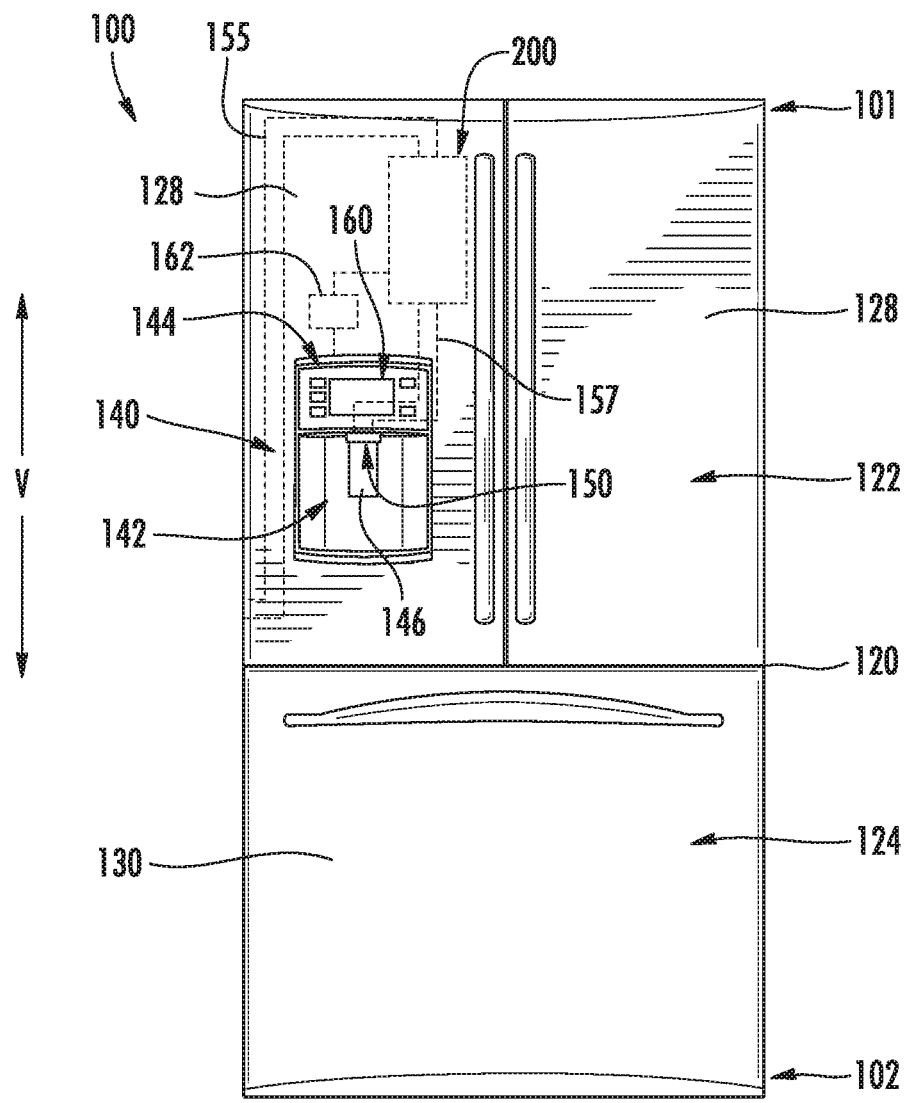
FIG. 1 provides a front view of a refrigerator appliance according to example embodiments of the present disclosure.
Figure 2:
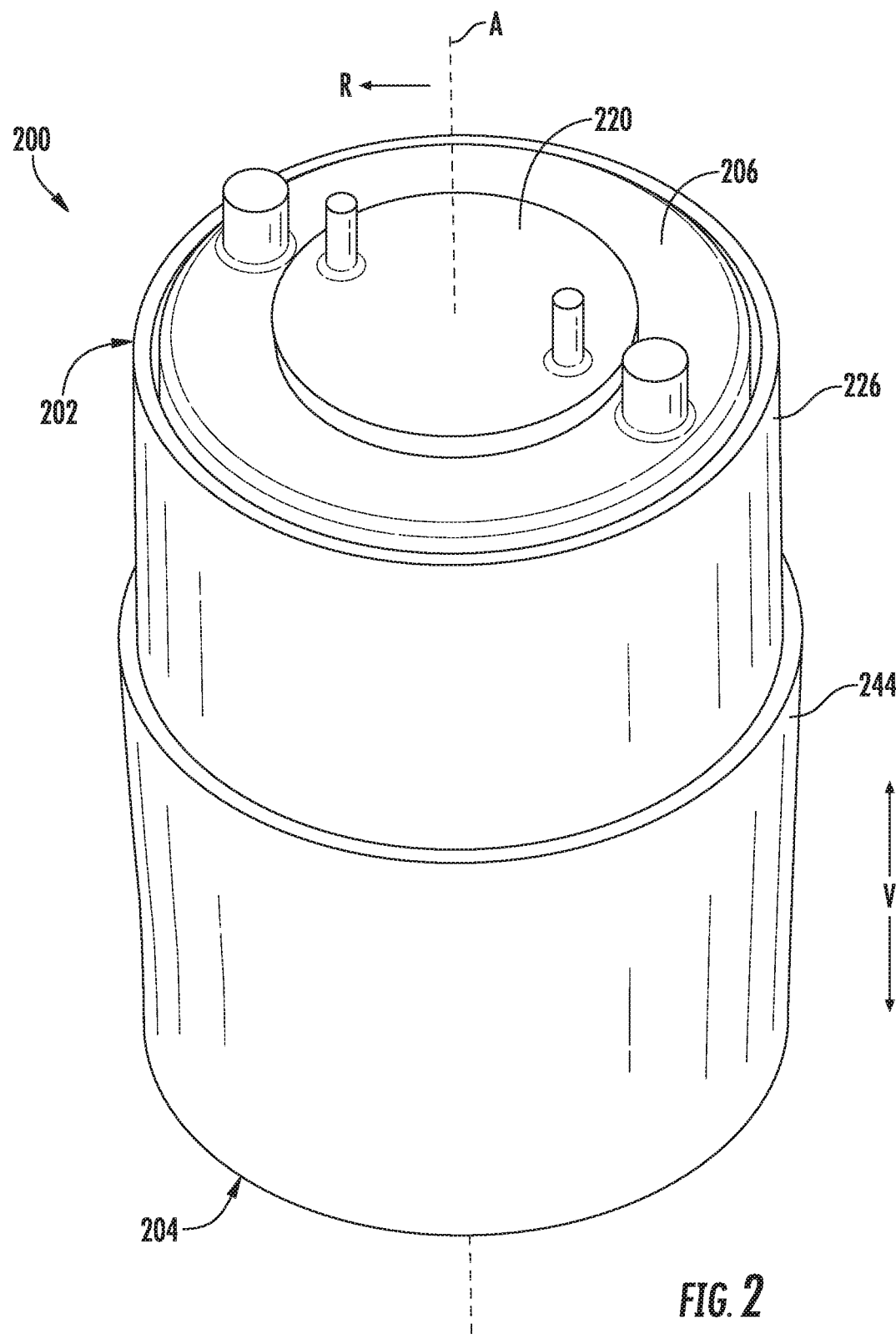
FIG. 2 provides a top perspective view of an extraction fluid assembly according to example embodiments of the present disclosure.
Figure 3:
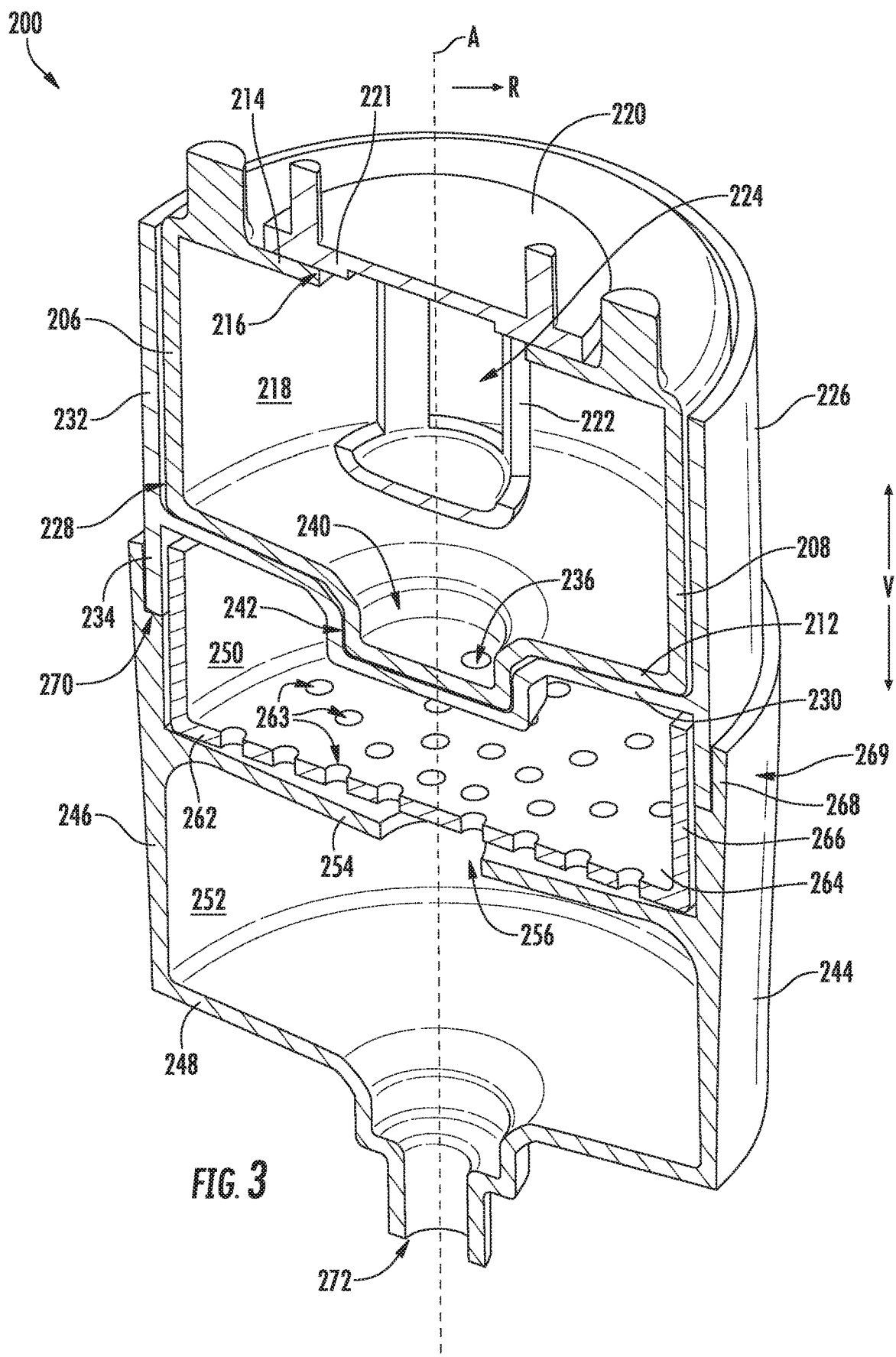
FIG. 3 provides a cross-sectional top perspective view of the example extraction fluid assembly of FIG. 2.
Figure 4:
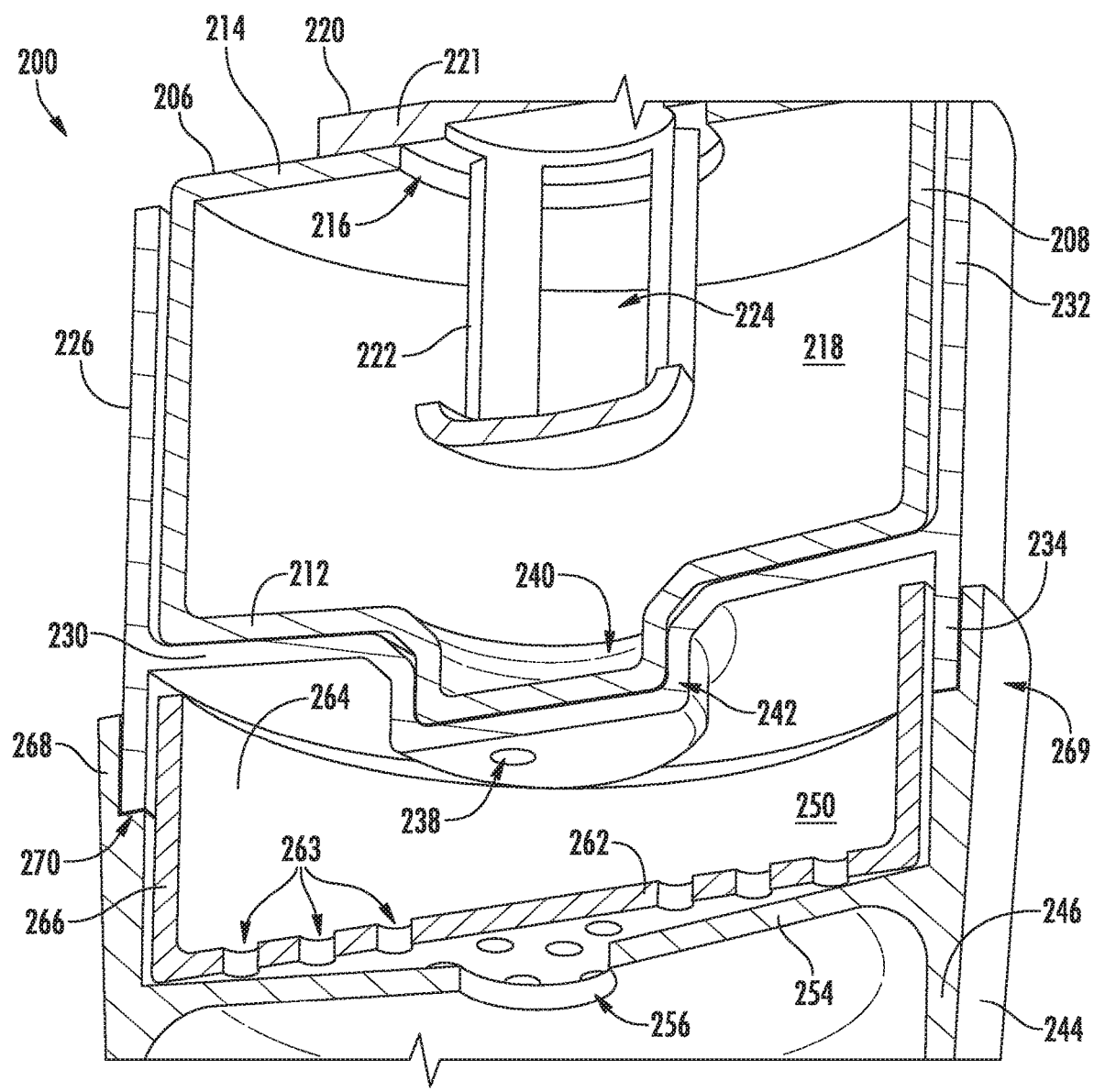
FIG. 4 provides a partial bottom perspective view of the example extraction fluid assembly of FIG. 2.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Generally, the present disclosure provides an assembly for generating and/or dispensing an extraction fluid, such as a stevia extract. The assembly may be a stand-alone device or mounted within a consumer appliance, such as a refrigerator. Moreover, the assembly may include a fluid tank that can hold a liquid solvent and open container holding an additive. A dispenser housing may support the fluid tank and a filter assembly, as will be described in detail below.

Turning now to the figures, FIG. 1 provides a front, elevation view of a refrigerator appliance 100 according to an example embodiment of the disclosure. Refrigerator appliance 100 includes a cabinet or housing 120. Housing 120 extends between an upper portion 101 and a lower portion 102 along a vertical direction V. Housing 120 defines chilled chambers, e.g., a fresh food compartment 122 positioned adjacent upper portion 101 of housing 120 and a freezer compartment 124 arranged at lower portion 102 of housing 120. Housing 120 also defines a mechanical compartment (not shown) for receipt of a sealed cooling system for cooling fresh food compartment 122 and freezer compartment 124.

Refrigerator appliance 100 is generally referred to as a bottom-mount refrigerator appliance. However, it should be understood that refrigerator appliance 100 is provided by way of example only. Thus, the present subject matter is not limited to refrigerator appliance 100 and may be utilized in any suitable configuration. For example, one of skill in the art will understand that the present subject matter may be used with side-by-side style refrigerator appliances or top-mount refrigerator appliances, as well as independent of any refrigeration appliance or system.

Refrigerator doors 128 are rotatably hinged to housing 120 proximate fresh food compartment 122 in order to permit selective access to fresh food compartment 122. A freezer door 130 is arranged below refrigerator doors 128 for accessing freezer compartment 124. Freezer door 130 is mounted to a freezer drawer (not shown) slidably coupled within freezer compartment 124.

In some embodiments, an extraction fluid assembly 200 is provided within a sub-compartment of refrigerator 100. For instance, the sub-compartment may be defined on refrigerator door 128. When assembled, sub-compartment may thus extend into fresh food chamber 122 when door 128 is in the closed position. In additional or alternative embodiments, extraction fluid assembly 200 is mounted to cabinet 120 directly within fresh food chamber 122. Optionally, a water supply conduit 155 may be disposed within cabinet 120 and in fluid communication with one or more portions of refrigerator 100. When assembled, water supply conduit 155 may further be in fluid communication with a water supply (not pictured), such as a residential hot water heating system, municipal water system, and/or well.

Refrigerator appliance 100 may also include a dispensing assembly 140 for dispensing various fluids, such as liquid water, extraction fluid, and/or ice, to a dispenser recess 142 defined on one of refrigerator doors 128. In some embodiments, dispensing assembly 140 includes a dispenser 144 positioned on an exterior portion of refrigerator appliance 100, for example, within dispenser recess 142. Dispenser 144 may be in fluid communication with extraction fluid assembly 200. Additionally or alternatively, dispenser 144 may include several outlets 150 for accessing ice, chilled liquid water, heated liquid water, and/or extraction fluid. In order to access ice, chilled liquid water, heated liquid water, and extraction fluid; water-dispensing assembly 140 may, for example, include a paddle 146 mounted below one or more outlets 150.

During operation of dispensing assembly 140, a user may urge a vessel, such as a cup, against paddle 146 to initiate a flow of chilled liquid water, heated liquid water, extraction fluid, and/or ice into the vessel within dispenser recess 142. In particular, a control panel or user interface panel 160 may be provided for controlling the mode of operation of dispenser 144, e.g., for selecting chilled liquid water, heated liquid water, crushed ice, and/or whole ice. User interface panel 160 may include a chilled water dispensing button (not labeled), an ice-dispensing button (not labeled) and a heated water dispensing button (not labeled) for selecting between chilled liquid water, ice, and heated liquid water, respectively. User interface panel 160 may also include a display component, such as a digital or analog display device designed to provide operational feedback to the user.

One or more outlets 150 and paddle 146 may comprise an external part of dispenser 144 positioned at or adjacent dispenser recess 142, e.g., a concave portion defined in an outside surface of refrigerator door 128. Dispenser 144 is positioned at a predetermined elevation convenient for a user to access ice or liquid water, e.g., enabling the user to access ice without the need to bend-over and without the need to access freezer compartment 124. In example embodiments, dispenser 144 is positioned at a level that approximates the chest level of a user.

Operation of the refrigerator appliance 100 can be regulated by a controller 162 that is operatively coupled to user interface panel 160 and/or various sensors. User interface panel 160 provides selections for user manipulation of the operation of refrigerator appliance 100 such as e.g., selections between whole or crushed ice, chilled water, extraction fluid, and/or other various options. In response to user manipulation of the user interface panel 160 or sensor signals, controller 162 may operate various components of the refrigerator appliance 100. Controller 162 may include a memory and one or more microprocessors, CPUs or the like, such as general or special purpose microprocessors operable to execute programming instructions or micro-control code associated with operation of refrigerator appliance 100. The memory may represent random access memory such as DRAM, or read only memory such as ROM or FLASH. In one embodiment, the processor executes non-transitory programming instructions stored in memory. The memory may be a separate component from the processor or may be included onboard within the processor. Alternatively, controller 162 may be constructed without using a microprocessor, e.g., using a combination of discrete, non-transitory analog and/or digital logic circuitry (such as switches, amplifiers, integrators, comparators, flip-flops, AND gates, and the like) to perform control functionality instead of relying upon software.

Controller 162 may be positioned in a variety of locations throughout refrigerator appliance 100. In the illustrated embodiment, controller 162 is located within the user interface panel 160. In other embodiments, the controller 162 is positioned at any suitable location within refrigerator appliance 100, such as for example within a fresh food chamber, a freezer door, etc. Input/output ("I/O") signals may be routed between controller 162 and various operational components of refrigerator appliance 100. For example, user interface panel 160 may be in communication with controller 162 via one or more signal lines or shared communication busses.

As illustrated, controller 162 may be in communication with the various components of dispensing assembly 160 and may control operation of the various components. For example, the various valves, switches, etc. may be actuatable based on commands from the controller 162. As discussed, interface panel 160 may additionally be in communication with the controller 162. Thus, the various operations may occur based on user input or automatically through controller 162 instruction.

In certain embodiments, refrigerator appliance 100 also includes features for generating heated liquid water and directing such heated liquid water to dispenser 144. Refrigerator appliance 100 need not be connected to a residential hot water heating system in order to supply heated liquid water to dispenser 144. Features of such a water heating assembly may include, for example, a variety of water supplies, hot water tanks, heating elements, temperature sensors, and control valves to heat water from a well or municipal water system, store the heated water, and supply the heated water to dispenser 144, as would be understood by one of ordinary skill in the art.

Dispensing assembly 140 is optionally capable of providing heated water at various temperatures depending on the desired extraction. For example, when generating a stevia extract, water for extraction may be heated to between fifty degrees Celsius and ninety degrees Celsius. Additionally or alternatively, dispensing assembly 140 may be adjusted, e.g., via controller 162, to provide water for making beverages or extracts at any suitable temperature.

Turning now to FIGS. 2 through 6, multiple views of extraction fluid assembly 200 in isolation (e.g., independent of a refrigerator appliance) are provided. As shown, extraction fluid assembly 200 may generally define a central axis A. When assembled, the central axis A may be parallel to the vertical direction V, as shown in FIG. 1. In some such embodiments, extraction fluid assembly 200 extends along the central axis A from a top end 202 to a bottom end 204. A sidewall 208 may be positioned radially outward from the central axis A (i.e., away from central axis along a radial direction R) and extend circumferentially about the central axis A. As will be described in detail below, several components of extraction fluid assembly 200 may be stackable such that they are supported as successive tiers along the central axis A. In turn, some embodiments of extraction fluid assembly 200 may be readily disassembled and reassembled for easy and effective cleaning.

As shown, a fluid tank 206 is provided to receive a liquid solvent, such as water delivered from water supply conduit 155 (FIG. 1). Additionally or alternatively, another suitable liquid solvent (e.g., alcohols, organic liquid solvents, etc.) may be received within fluid tank 206. Generally, a tank sidewall 208 extends about a tank base 212, e.g., coaxial to central axis A. Tank base 212 defines a bottom portion of fluid tank 206 and may extend radially outward from the vertical direction V and/or central axis A, e.g., perpendicular to the vertical direction V. Thus, tank sidewall 208 may extend above tank base 212 along the vertical direction V, e.g., parallel to the central axis A. Additionally, tank sidewall 208 may extend circumferentially about the central axis A. In some embodiments, a top wall 214 of fluid tank 206 extends radially inward from sidewall 208, opposite from tank base 212. Together, tank base 212, tank sidewall 208, and/or top wall 214 may define an extraction chamber 218 to receive the liquid solvent. Moreover, a vertical tank inlet 216 may be defined through top wall 214, e.g., along the central axis A, to receive the liquid solvent as it is directed to extraction chamber 218.

As shown, open container 220 is disposed on fluid tank 206. For instance, open container 220 may be mounted such that it may be readily removed from and remounted to fluid tank 206 as desired. As shown, open container 220 may include a cage 222 defining a particulate cavity 224. During use, cage 222 may hold or contain an additive 225, such as leaves and/or one or more soluble materials, within particulate cavity 224. When mounted, cage 222, including particulate cavity 224, extends at least partially within extraction chamber 218. The solvent within extraction chamber 218 may freely flow into particulate cavity 224 such that the solvent dissolves and/or extracts portions of the additive 225, which may subsequently diffuse into the liquid solvent and permeate from cage 222 within extraction chamber 218 to form an extraction fluid. In the illustrated embodiments, open container 220 includes a lid 221 resting on top wall 214 in the mounted position. However, alternative embodiments may position open container 220 on another portion fluid tank 206, e.g., such that open container 220 is placed entirely within extraction chamber 218 and is enclosed by fluid tank 206.

In some embodiments, a tank housing 226 receives at least a portion of fluid tank 206. When assembled, fluid tank 206 may thus be supported by or within a portion of tank housing 226. In turn, tank housing 226 defines a housing cavity 228 to receive fluid tank 206. As shown, the housing cavity 228 may be formed to complement the received portion of fluid tank 206. For instance, an intermediate wall 230 may extend radially outward from the vertical direction V and/or central axis A, e.g., perpendicular to the vertical direction V, to complement tank base 212. Moreover, an upper wall 232 may extend above intermediate wall 230. Upper wall 232 may be positioned radially outward from the central axis A and extend circumferentially about the central axis A, thereby complementing the received sidewall 208. In some embodiments, a lower wall 234 may extend below intermediate wall 230 to engage another portion of extraction fluid assembly 200. Lower wall 234 may be positioned radially outward from the central axis A and extend circumferentially about the central axis A, e.g., in parallel to upper wall 232. Lower wall 234 may generally be contiguous with upper wall 232 and, optionally, formed at the same radial distance from central axis A.

As shown, fluid tank 206 and tank housing 226 each define a discrete fluid passage 236 and 238 to permit the flow of extraction fluid therethrough. One fluid passage 236 may be defined through tank base 212 while another fluid passage 238 is defined through intermediate wall 230. Optionally, the fluid passages 236, 238 may be offset from the central axis A, as shown. In other words, each passage 236 and 238 may be defined at radially distal positions such that they are not coaxial with the central axis A. In some such embodiments, the fluid passages 236, 238 may be rotated into and out of alignment with each other. For instance, fluid tank 206 may rotate within tank housing 226, when the fluid passages 236, 238 are aligned, e.g., coaxial or otherwise in mutual fluid communication, extraction fluid may be permitted from extraction chamber 218 and through tank housing 226. When the fluid passages 236, 238 are misaligned, e.g., in non-overlapping positions or otherwise in fluid isolation from each other, extraction fluid may held within extraction chamber 218 and prevented from flowing out of the same.

In some embodiments, tank base 212 defines a vertical recess 240, extending downward below the remaining portion of tank base 212. A complementary recess 242 may similarly be defined by intermediate wall 230 of tank housing 226. Both vertical recess 240 and complementary recess 242 may be defined about or coaxial with the central axis A. In turn, fluid tank 206 may be securely and/or rotatably held or stacked within tank housing 226 when assembled.

As part of the assembled extraction fluid assembly 200, a dispenser housing 244 is generally positioned beneath fluid tank 206. As shown, dispenser housing 244 includes an outer wall 246 extending at least partially in the vertical direction V. In some such embodiments, outer wall 246 further extends circumferentially about the central axis A. A bottom wall 248 may extend radially inward from outer wall 246, e.g., at the bottom end 204 of extraction fluid assembly 200.

Dispenser housing 244, including outer wall 246, generally defines one or more chambers 250, 252 in fluid communication (e.g., selective fluid communication) with extraction chamber 218. For instance a dispensing chamber 252 may be defined within dispenser housing 244, e.g., at least partially by outer wall 246 and bottom wall 248. In some such embodiments, an interior wall 254 extends radially inward from outer wall 246, e.g., above bottom wall 248. A chamber inlet 256 defined vertically through interior wall 254, e.g., along the central axis A, thus provides a path for extraction fluid to flow into the dispensing chamber 252 from fluid tank 206 and/or tank housing 226.

In some embodiments, a filtration chamber 250 is defined above interior wall 254, e.g., between interior wall 254 and intermediate wall 230. Filtration chamber 250 is generally provided in fluid communication with extraction chamber 218, e.g., through fluid passages 236, 238) and dispensing chamber 252 (e.g., through chamber inlet 256). Within filtration chamber 250, a filter assembly 258 is selectively positioned and/or stacked. In other words, filter assembly 258 is positioned beneath the fluid tank 206 and above the dispensing chamber 252. As shown, filter assembly 258 may include a filtration media 260 and/or a perforated disc 262. Filtration media 260 may include, for instance, an organic mesh, inorganic mesh, activated carbon block, or other suitable filtration material, as well as combinations thereof. Perforated disc 262 may define a plurality of vertical apertures 263 to permit the flow of extracted fluid therethrough. Optionally, perforated disc 262 may be formed on a media housing 264. As shown, media housing 264 that further includes a perimeter wall 266 extending above perforated disc 262. In some such embodiments, filtration media 260 may be supported on perforated disc 262 and stacked within media housing 264. One or both of filtration media 260 and perforated disc 262 may be positioned across or over chamber inlet 256. Filter assembly 258 may thus be in fluid communication with extraction chamber 218 to filter or otherwise remove undesired particulate from the extraction fluid. For instance, small particles of leaves or undissolved portions of the additive 225 may be removed from the extraction fluid at filter assembly 258 as it flows therethrough and to dispensing chamber 252.

When assembled, one or more portions of extraction fluid assembly 200 may be supported on dispenser housing 244. For instance, filter assembly 258 may be supported on interior wall 254 and stacked between fluid tank 206 and dispensing chamber 252. An upper segment 268 of outer wall 246 may extend above interior wall 254 to support fluid tank 206 and/or tank housing 226. In some such embodiments, a notch 270 is defined radially inward from an outermost (e.g., radially outermost) surface 269 of upper segment 268. For instance, notch 270 may extend circumferentially about the central axis A along an inner portion of outer wall 246. In turn, a portion of upper wall 232 may be received within notch 270 such that lower wall 234 is positioned radially inward from outer wall 246, e.g., at the upper segment 268. Thus, tank housing 226 may be stacked onto or within dispenser housing 244 while fluid tank 206 is stacked onto or within tank housing 226. Moreover, as described above, filter assembly 258 may be stacked onto or within dispenser housing 244 beneath tank housing 226.

A chamber outlet 272 is generally defined through a portion of dispenser housing 244 to permit the passage of extraction fluid from dispensing chamber 252. For instance, in some embodiments, chamber outlet 272 is defined vertically through bottom wall 248, e.g., along central axis A. Returning briefly to FIG. 1, chamber outlet 272 may generally be provided in fluid communication the dispenser recess 142 (FIG. 1) via one or more additional fluid conduits 157. When assembled, extraction fluid assembly 200 may be operably coupled to controller 162 (e.g., at a valve or dosing mechanism) to selectively direct extraction fluid from dispensing chamber 252 to dispenser recess 144 (FIG. 1).

Figure 5:
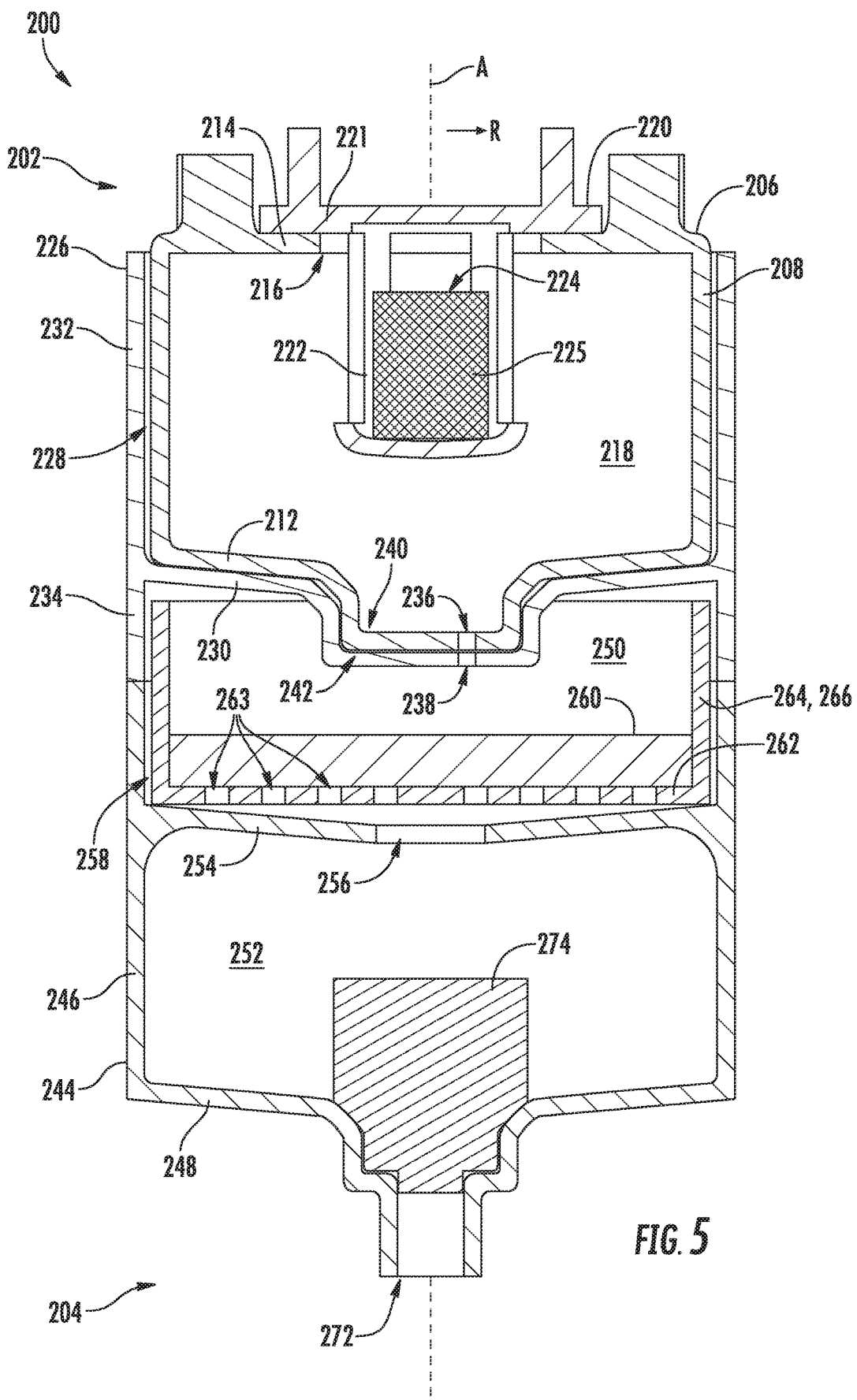
FIG. 5 provides a cross-sectional side view of the example extraction fluid assembly of FIG. 2.
Figure 6:
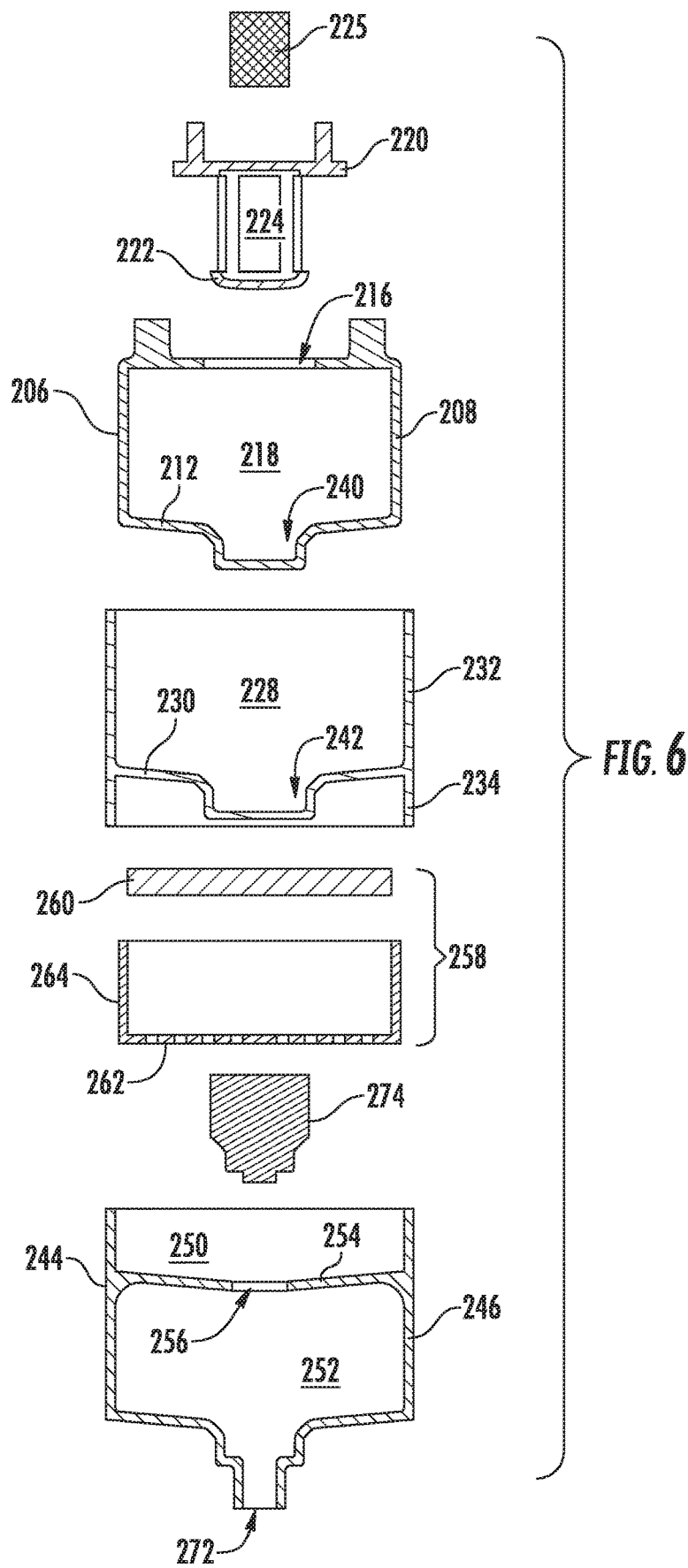
FIG. 6 provides an exploded cross-sectional side view of the example extraction fluid assembly of FIG. 5.
Figure 7:
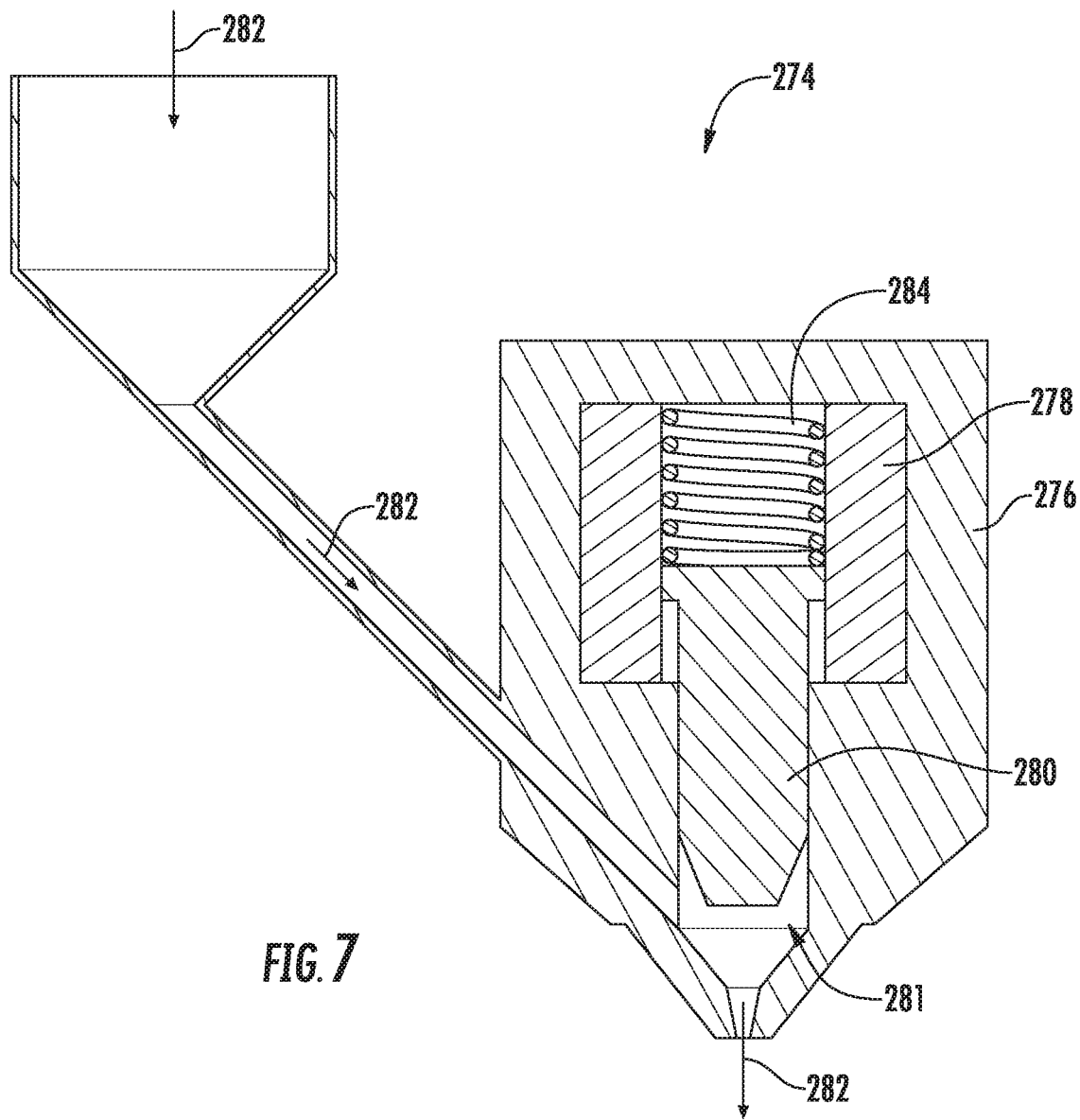
FIG. 7 provides a cross-sectional view of a precision doser for an extraction fluid assembly according to example embodiments of the present disclosure.

Turning to FIGS. 5 through 7, an example embodiment of precision dosing mechanism or doser 274 is illustrated. It is understood that within FIGS. 5 and 6, precision doser 274 is generally represented schematically, while FIG. 7 provides further details and example components of some such embodiments. Generally, precision doser 274 may be mounted in fluid communication with the dispensing chamber 252 to direct an extraction fluid therefrom. For instance, precision doser 274 may be disposed within dispensing chamber 252 above chamber outlet 272. During operations, precision doser 274 may selectively release extraction fluid from dispensing chamber 252 through chamber outlet 272, e.g., as commanded by a user and/or controller 162 (FIG. 1).

As illustrated in FIG. 7, some embodiments of precision doser 274 include a dosing body 276 holding a solenoid 278 and plunger 280. Together, the solenoid 278 and plunger 280 selectively block or restrict flow through a fluid pathway (represented by arrows 282) defined through dosing body 276. For instance, solenoid 278 may be operatively connected to a slidable plunger 280 to force plunger 280 upward, e.g., along the vertical direction V, and away from the fluid pathway 282. In turn, slidable plunger 280 is disposed within a release cavity 281 to selectively block or permit fluid through the pathway 282. A spring 284 may further be provided, e.g., within dosing body 276, to bias plunger 280 downward towards fluid pathway 282. It is noted that, although an example precision doser 274 is illustrated in FIG. 7, another suitable dosing mechanism may be provided, as would be understood by one of ordinary skill in the art.

Figure 8:
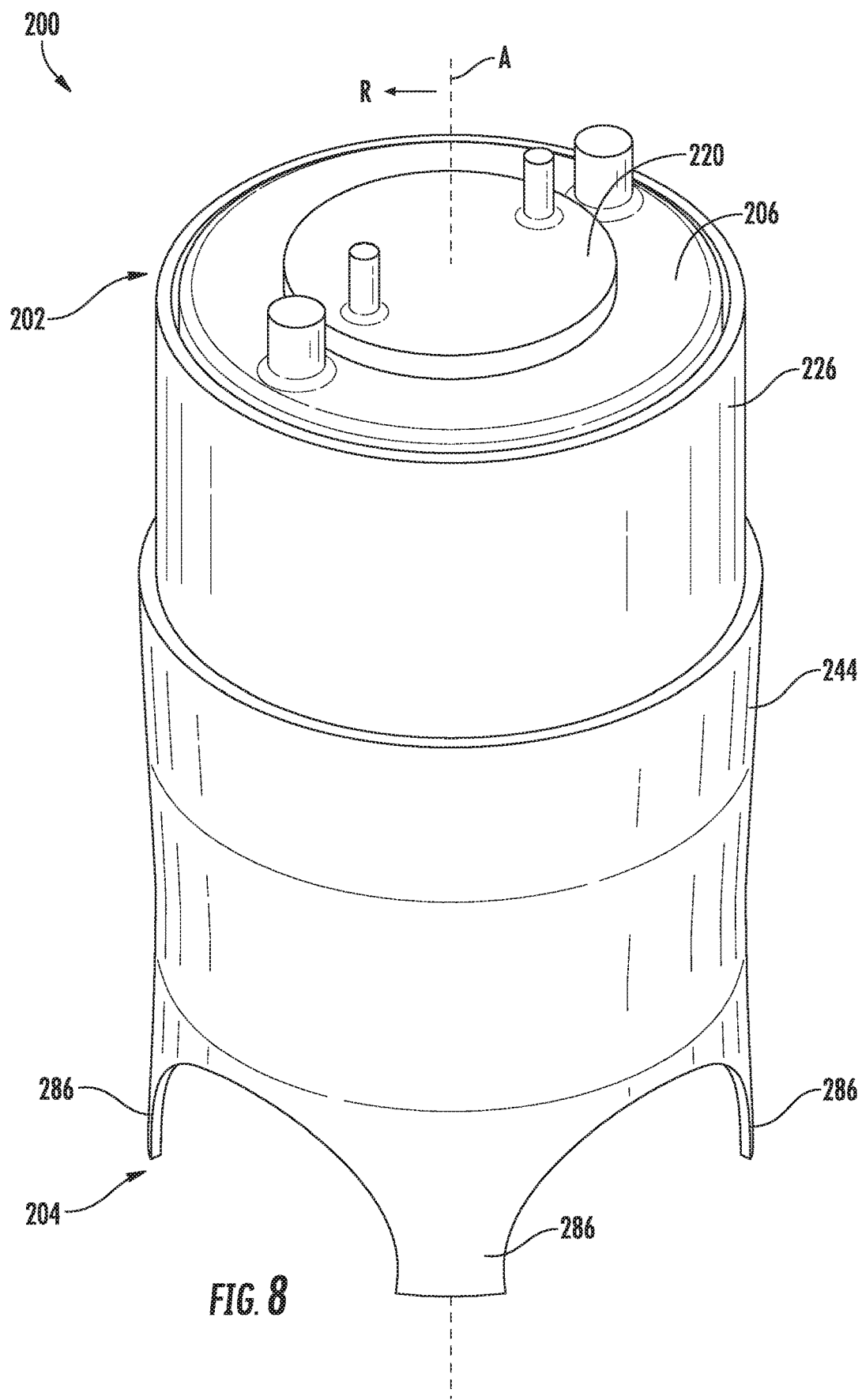
FIG. 8 provides a top perspective view of an extraction fluid assembly according to further example embodiments of the present disclosure.
Figure 9:
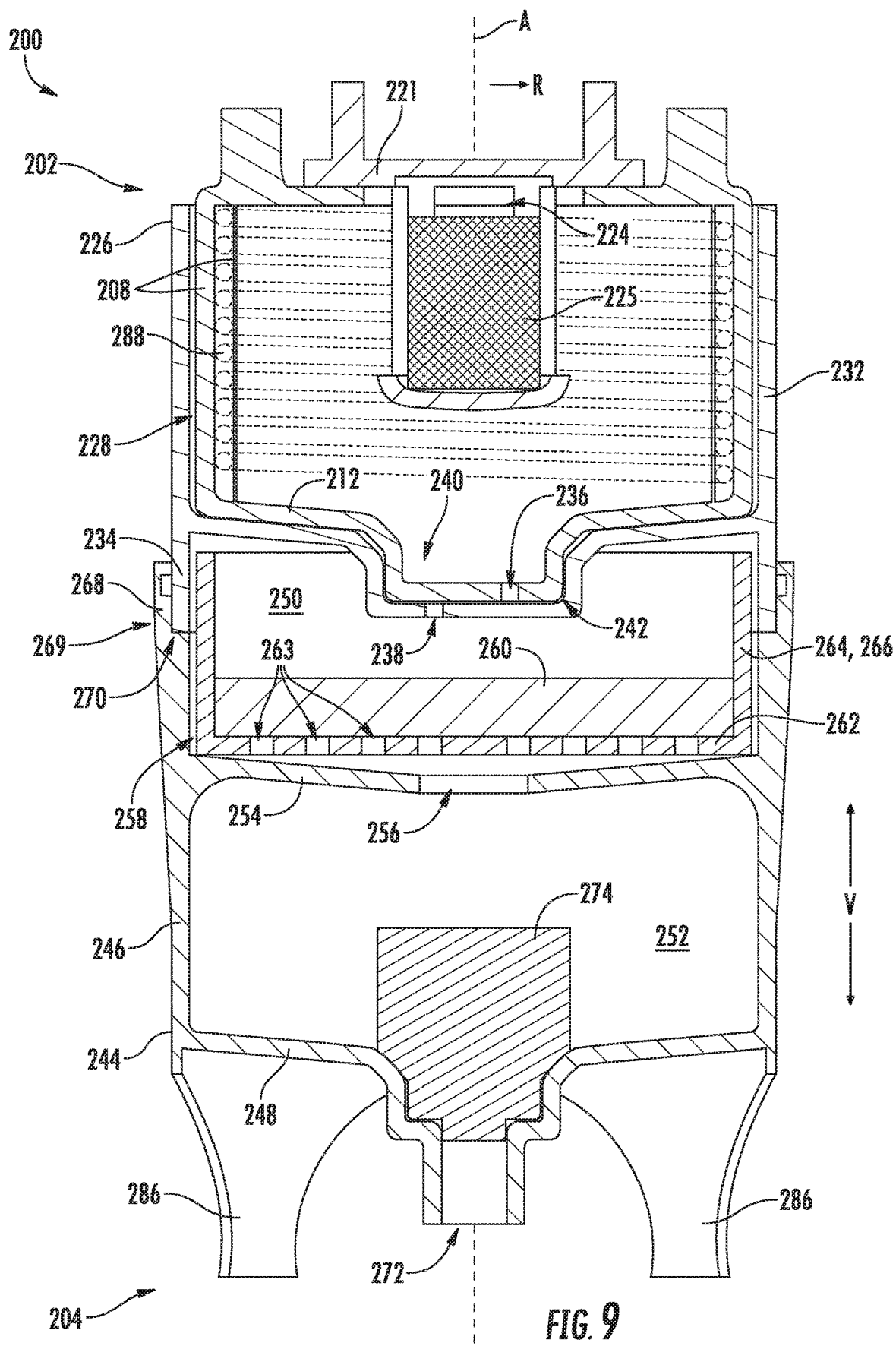
FIG. 9 provides a cross-sectional side view of the extraction fluid assembly of FIG. 8.

Turning now to FIGS. 8 and 9, further example embodiments of extraction fluid assembly 200 are illustrated. Except as otherwise indicated, it is understood that the embodiments of FIGS. 8 and 9 are substantially similar to the embodiments shown in FIGS. 1 through 7 and described above. In turn, corresponding features are similarly labeled, though specific differences will be noted below. Moreover, it is understood that additional or alternative embodiments of may include one or more features of the embodiments of FIGS. 8 and 9, as well as one or more of the features of the embodiments of FIGS. 1 through 7.

As shown in FIGS. 8 and 9, certain embodiments of extraction fluid assembly 200 may be free-standing or otherwise self-supporting structures. Thus, such embodiments may be used with or without additional appliances/components. In some embodiments, extraction fluid assembly 200 includes one or more support legs 286. Support legs 286 may generally extend in the vertical direction V below dispenser housing 244. Specifically, support legs 286 may extend below chamber outlet 272 such that chamber outlet 272 is held above a supporting surface (e.g., table, countertop, floor, etc.) and is otherwise accessible (e.g., for user) to permit the flow of extraction fluid from chamber outlet 272.

In some embodiments, a heater 288 is provided within extraction fluid assembly 200. For instance, a heater 288 may be mounted within sidewall 208 of fluid tank 206. During operations, heater 288 may thus act to heat solvent and/or extraction fluid within extraction chamber 218, thereby facilitating or accelerating certain extraction operations. It is understood that before such operations, open container 220 may be removed from fluid tank 206 and liquid solvents may be added to extraction chamber 218, e.g., through vertical tank inlet 216, before returning open container 220 to its mounted position on fluid tank 206.

In some such embodiments, the heater 288 is operably coupled to an electric power source and/or controller (e.g., controller 162—FIG. 1) that is configured to selectively activate heater 288 according, for instance, to one or more programmed cycles and/or received inputs (e.g., from a temperature sensor mounted within extraction chamber 218). Generally, heater 288 may be any suitable heating source to selectively heat fluid within extraction chamber 218. In the illustrated embodiments of FIGS. 8 and 9, heater 288 is formed as an electric resistive wire coiled within fluid tank 206. However, it is understood that other suitable heat-generating embodiments may be provided within the scope of the present disclosure. For instance, additional or alternative embodiments may include one or more heat-generating mechanisms mounted along an open container 220, top wall 214, tank base 212, upper wall 232, etc.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A refrigerator appliance defining a vertical direction, the refrigerator appliance comprising:
    a cabinet defining a chilled chamber;
    a door being rotatably hinged to the cabinet to rotate between a closed position restricting access to the chilled chamber and an open position permitting access to the chilled chamber; and
    an extraction fluid assembly positioned within the chilled chamber at the closed position, the extraction fluid assembly comprising:
        a fluid tank defining an extraction chamber to receive a liquid solvent,
        an open container selectively disposed on the fluid tank to hold an additive within the extraction chamber,
        a filter assembly comprising a filtration media positioned beneath the fluid tank along the vertical direction in fluid communication with the extraction chamber,
        a dispenser housing supporting the filter assembly, the dispenser housing defining a dispensing chamber positioned beneath the filter assembly and in fluid communication with the filter assembly, and
        a precision doser in fluid communication with the dispensing chamber to direct an extraction fluid from the dispensing chamber,
    wherein the extraction fluid assembly is mounted on the door to rotate with the door.

2. The refrigerator appliance of claim 1, wherein the door defines a dispenser recess, and wherein the dispenser recess is in selective fluid communication with the dispensing chamber through the precision doser.

3. The refrigerator appliance of claim 1, further comprising a tank housing receiving the fluid tank, the tank housing being supported on the dispenser housing.

4. The refrigerator appliance of claim 1, wherein the dispenser housing defines a chamber inlet, and wherein the filtration media is positioned above the chamber inlet.

5. The refrigerator appliance of claim 4, wherein the filter assembly further comprises a media housing defining one or more vertical apertures, and wherein the filtration media is stacked within the media housing.

6. The refrigerator appliance of claim 1, wherein the precision doser comprises a solenoid to selectively restrict extraction fluid from the dispensing chamber.

7. The refrigerator appliance of claim 1, wherein the dispenser housing defines a chamber outlet, and wherein the precision doser is positioned within the dispensing chamber above the chamber outlet.

8. The refrigerator appliance of claim 1, wherein the extraction fluid assembly further defines a central axis parallel to the vertical direction, and wherein the fluid tank defines a vertical fluid passage radially spaced apart from the central axis.

9. A refrigerator appliance defining a vertical direction, the refrigerator appliance comprising:
    a cabinet defining a chilled chamber;
    a door being rotatably hinged to the cabinet to rotate between a closed position restricting access to the chilled chamber and an open position permitting access to the chilled chamber; and
    an extraction fluid assembly positioned within the chilled chamber at the closed position, the extraction fluid assembly comprising:
        a fluid tank defining an extraction chamber to receive a liquid solvent,
        an open container selectively disposed on the fluid tank to hold an additive within the extraction chamber,
        a filter assembly comprising a filtration media positioned beneath the fluid tank along the vertical direction in fluid communication with the extraction chamber,
        a dispenser housing supporting the filter assembly, the dispenser housing defining a dispensing chamber positioned beneath the filter assembly and in fluid communication with the filter assembly,
        a precision doser in fluid communication with the dispensing chamber to direct an extraction fluid from the dispensing chamber, and
        a tank housing receiving the fluid tank, the tank housing being supported on the dispenser housing.

10. The refrigerator appliance of claim 9, wherein the door defines a dispenser recess, and wherein the dispenser recess is in selective fluid communication with the dispensing chamber through the precision doser.

11. The refrigerator appliance of claim 9, wherein the dispenser housing defines a chamber inlet, and wherein the filtration media is positioned above the chamber inlet.

12. The refrigerator appliance of claim 11, wherein the filter assembly further comprises a media housing defining one or more vertical apertures, and wherein the filtration media is stacked within the media housing.

13. The refrigerator appliance of claim 9, wherein the precision doser comprises a solenoid to selectively restrict extraction fluid from the dispensing chamber.

14. The refrigerator appliance of claim 9, wherein the dispenser housing defines a chamber outlet, and wherein the precision doser is positioned within the dispensing chamber above the chamber outlet.

15. The refrigerator appliance of claim 9, wherein the extraction fluid assembly further defines a central axis parallel to the vertical direction, and wherein the fluid tank defines a vertical fluid passage radially spaced apart from the central axis.

16. A refrigerator appliance defining a vertical direction, the refrigerator appliance comprising:
   a cabinet defining a chilled chamber;
   a door being rotatably hinged to the cabinet to rotate between a closed position restricting access to the chilled chamber and an open position permitting access to the chilled chamber; and
   an extraction fluid assembly positioned within the chilled chamber at the closed position, the extraction fluid assembly comprising:
      a fluid tank defining an extraction chamber to receive a liquid solvent,
      an open container selectively disposed on the fluid tank to hold an additive within the extraction chamber,
      a filter assembly in fluid communication with the extraction chamber, the filter assembly comprising a media housing and a filtration media, the media housing defining one or more vertical apertures, the filtration media being stacked within the media housing beneath the fluid tank along the vertical direction,
      a dispenser housing supporting the filter assembly, the dispenser housing defining a dispensing chamber positioned beneath the filter assembly and in fluid communication with the filter assembly, and
      a precision doser in fluid communication with the dispensing chamber to direct an extraction fluid from the dispensing chamber.

17. The refrigerator appliance of claim 16, wherein the door defines a dispenser recess, and wherein the dispenser recess is in selective fluid communication with the dispensing chamber through the precision doser.

18. The refrigerator appliance of claim 16, wherein the precision doser comprises a solenoid to selectively restrict extraction fluid from the dispensing chamber.

19. The refrigerator appliance of claim 16, wherein the dispenser housing defines a chamber outlet, and wherein the precision doser is positioned within the dispensing chamber above the chamber outlet.

20. The refrigerator appliance of claim 16, wherein the extraction fluid assembly further defines a central axis parallel to the vertical direction, and wherein the fluid tank defines a vertical fluid passage radially spaced apart from the central axis.

* * * * *